United States Patent [19]

Conklin

[11] 4,194,237

[45] Mar. 18, 1980

[54] LEVELING PLATE AND METHOD OF UTILIZING SAME

[76] Inventor: Albert H. Conklin, 377 Woonasquatucket Ave., North Providence, R.I. 02911

[21] Appl. No.: 927,493

[22] Filed: Jul. 24, 1978

[51] Int. Cl.² ............................................. F21V 33/00
[52] U.S. Cl. ................................... 362/253; 362/382; 362/418; 362/431
[58] Field of Search ................. 362/253, 418, 382, 431

[56] References Cited

U.S. PATENT DOCUMENTS 3,671,738   6/1972   Beahley .............................. 362/431

*Primary Examiner*—Stephen J. Lechert, Jr.
*Attorney, Agent, or Firm*—Thomas J. Greer, Jr.

[57] ABSTRACT

A leveling plate for leveling bases of light standards. The leveling plate is provided along two adjacent sides at right angles to one another with spirit levels. The leveling plate is provided with openings for engagement over bolts of a predetermined pattern. Also the leveling plate is notched for the reception of electrical cables so that the leveling plate may be applied while the light standard is still attached to its foundation and without disconnecting the usual electrical cable.

4 Claims, 2 Drawing Figures

LEVELING PLATE AND METHOD OF UTILIZING SAME

This invention relates to a leveling plate for use in leveling supporting surfaces for a light standard. The leveling plate particularly adapted to level the supporting surfaces of break-a-way couplings which are mounted on standard anchor bolts for a light standard.

Street and highway streetlights are mounted on cement foundations with anchor bolts embedded in the foundation at given bolt centers. During the process of installing these foundations, which can be cast in place or be precast, the foundations are not always perfectly level. Therefore, when the light standard is installed, shims must be inserted to have the standard or pole plumb.

In addition, in many locales existing light standards are being provided with break-a-way couplings so that when the light standard is struck by a vehicle, the coupling will break and the pole will topple over in the direction of impact as opposed to breaking and falling back into the vehicle. In the installation of such break-a-way units, generally in the form of break-a-way couplings, at the present the light standard must be completely removed, the break-a-way couplings applied, and then the light standard reinstalled. Such an operation is expensive and normally requires disconnecting the electric cable or wire.

It is known to provide leveling devices for other purposes. Such leveling devices are provided with levels at right angles to one another to facilitate the leveling of the leveling device in all directions. The patent to Carlisle, U.S. Pat. No. 3,110,970 discloses such a leveling device. However, it is in noway intended for utilization in conjunction with the leveling of supports for a light standard.

According to the practice of this invention, there is provided a level plate which is in the form of a flat plate, generally rectangular in outline. The plate has mounted on two adjacent sides thereof and preferably at right angles to one another spirit levels so that the plate can be leveled in all directions. The plate is provided with a pattern of holes corresponding to the bolt pattern for the particular light standard. Further, one edge of the plate is provided with a notch into which the electric wire cable to a light standard may pass as the level plate is applied.

The level plate is most particularly adapted for use in providing existing light standards with break-a-way couplings. By utilizing the level plate, a light standard may be lifted slightly out of its installed position, the break-a-way couplings applied and then leveled utilizing the level plate, after which the light standard may be lowered back into place and rapidly installed without disconnecting the electrical cable.

IN THE DRAWINGS

Figure 1:
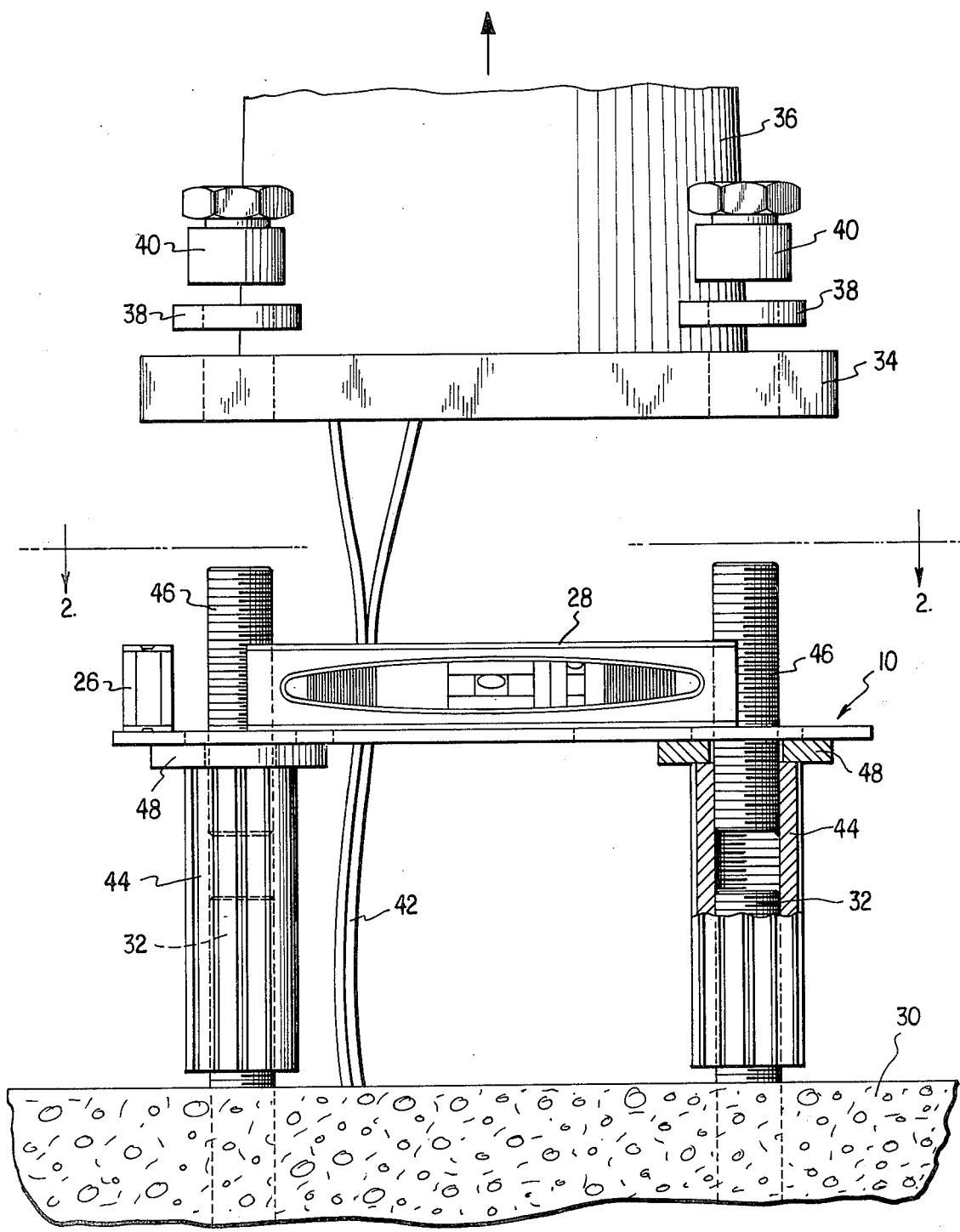
FIG. 1 is an exploded side elevational view showing the typical mounting of a light standard with the standard removed from its mounting and elevated and the leveling plate being utilized to level the supporting surfaces of break-a-way couplings.
Figure 2:
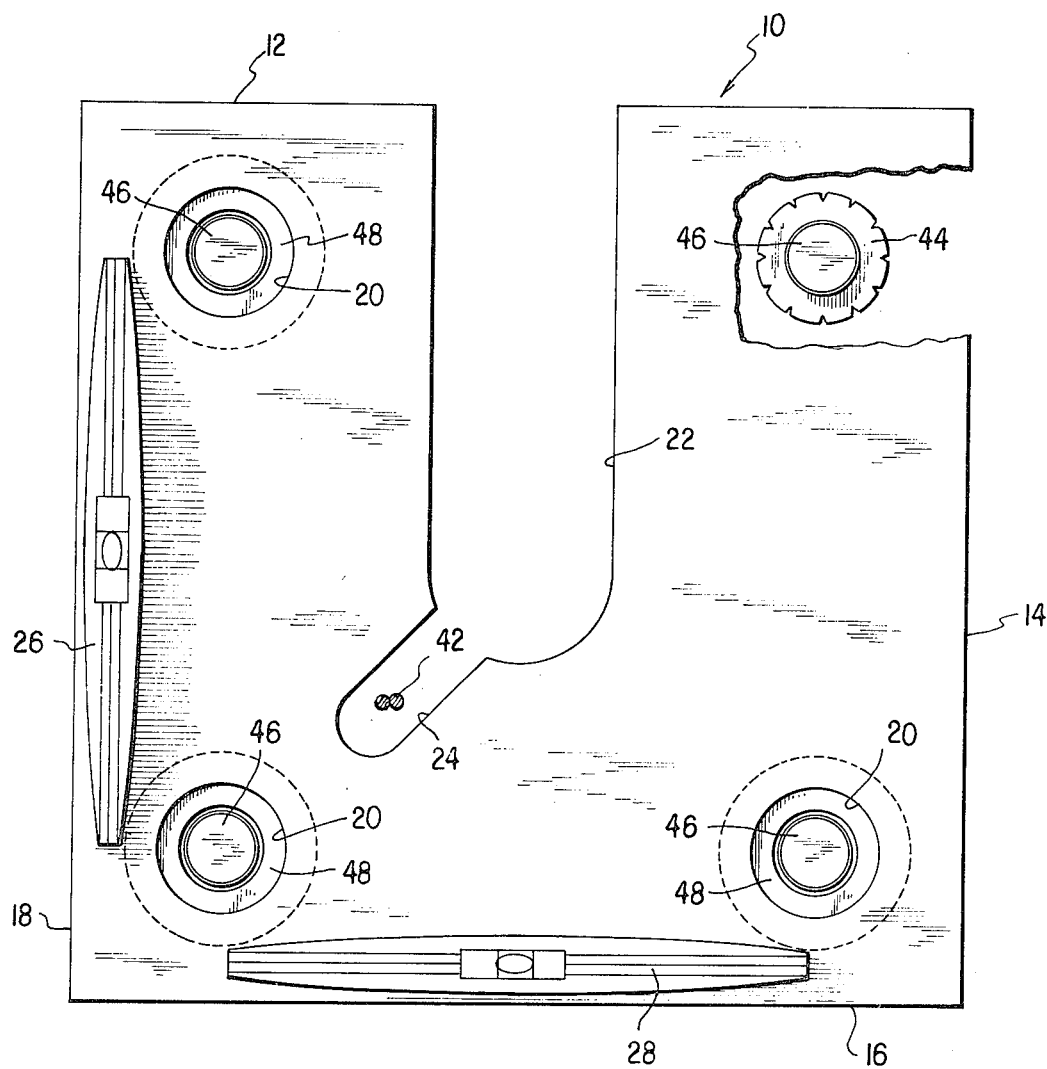
FIG. 2 is a plan view of the leveling plate taken generally along the line 2—2 of FIG. 1.

Referring now to the drawings, it will be seen that there is particularly illustrated in FIGS. 1 and 2 a leveling plate formed in accordance with the invention, the leveling plate being generally identified by the numeral 10. The leveling plate 10 is rectangular in outline, preferably square, and includes sides 12, 14, 16 and 18.

The leveling plate 10 is provided in a prescribed pattern in accordance with the bolt patterns of light standards which are to be leveled, a plurality of openings 20. Each opening 20 is oversized as compared to the diameter of a light standard supporting bolt which is to be received therethrough so as to facilitate the mounting of the leveling plate 10.

The leveling plate 10 is also provided with a relatively wide notched portion 22 which extends inwardly from the center of the side 12 pass the center of the leveling plate 10. A second and smaller notched portion 24 extends from the inner end of the notched portion 22 towards an adjacent one of the openings 20. The notched portion 24 is centered generally along a line extending between the center of that one opening 20 and the center of the plate 10.

Finally, the plate 10 has secured to the upper surface thereof along two adjacent sides, a pair of spirit levels 26, 28. In the illustrated embodiment of the invention, the spirit levels 26, 28 are disposed adjacent the sides 18 and 16, respectively.

Reference is now made to FIG. 1 wherein the leveling plate 10 is illustrated in use in conjunction with the application of break-a-way couplings to an existing liquid standard installation. The existing light standard installation included a foundation 30 having extending upwardly therefrom a plurality of mounting bolts 32. Initially seated on the foundation 30 and secured in place by the mounting bolts 32 was the base 34 of a light standard 36. Each anchor bolt 32 carried a washer 38 and a nut member 40.

An electric cable or wire 42 extends up from the foundation 30 and into the light pole 36.

In accordance with this invention, there is to be incorporated within the support for the light pole 36 break-a-way couplings 44. Each break-a-way coupling 44 is internally threaded and has extending upwardly therefrom a mounting bolt 46. In use, the break-a-way couplings 44 are threaded onto the mounting bolts 32 and have their upper surfaces leveled.

In accordance with this invention, when it is desired to provide the installation for the light standard or pole 36, the bolts 40 are removed and utilizing a suitable crane or like hoist (not shown) the light standard 36 is elevated as shown in FIG. 1. It is to be understood that the electric wire or cable 42 remains attached.

Then the break-a-way couplings 44 are threaded onto the anchor bolts 32 and are generally leveled. Because of the size of the openings 20, it is normally necessary to position above each break-a-way coupling 44 a spacer or washer 48. Then the leveling plate 10 is first engaged relative to the electric cable 42, after which it is engaged over the anchor bolts 46 and seated on the washers 48. After the leveling plate 10 has been positioned as generally shown in FIG. 1, the break-a-way couplings 44 are vertically adjusted on the anchor bolts 32 until the leveling plate 10 is leveled as indicated by the spirit levels 26, 28.

After the break-a-way couplings 44 have been leveled, the leveling plate 10 and the washers 48 are removed, after which the light standard 36 is lowered into place and the washers 38 and the bolts 40 are again used to secure the base 34 on top of the break-a-way couplings 44.

It is to be understood that it takes a two-man crew only minutes to install the break-a-way couplings.

It is also to be understood that the leveling plate 10 could be utilized in mounting a light standard directly onto a foundation, such as foundation 30. It is to be understood that such foundations are not always necessarily level. As a result, it is necessary to utilize shims to level the base 34. The leveling plate 10 may be applied over the anchor bolts 32 and the outer level condition noted. Then, determining which of the bolts 32 is adjacent to the high point on the foundation 30, the leveling plate 10 may be manually lifted so that the spirit levels 26, 28 are leveled. It can then be determined the amount of shims to be placed on each of the remaining anchor bolts 32. Once this determination has been made, the leveling plate 10 is removed, the shims are applied and the leveling plate is once again returned to check the accuracy of the shim selection.

I claim:

1. A new article of manufacture comprising a leveling plate particularly adapted for leveling added supports for a light standard while the light standard remains electrically coupled, said leveling plate having holes therethrough in accordance with the pattern of retaining bolts for the light standard, a notch through one edge of said plate for the reception of an attached electrical wire of the light standard, and level means carried by said plate for leveling said plate.

2. The article of claim 1 wherein said notch includes a first notch portion extending through and beyond a center of said plate, and a second notch portion extending from said first notch portion generally towards one of said holes.

3. The article of claim 2 wherein said second notch portion is generally centered on a line extending between the plate center and said one hole.

4. The article of claim 1 wherein said plate has two adjacent sides at right angles to one another, and said level means includes a spirit level extending along each of said two sides.

* * * * *